(12) United States Patent
Adelman

(10) Patent No.: US 12,473,943 B2
(45) Date of Patent: Nov. 18, 2025

(54) SYSTEMS AND METHODS FOR A KEY OPTIMIZED DOUBLE GATED CARABINER

(71) Applicant: Nite Ize, Inc., Boulder, CO (US)

(72) Inventor: Gregory M. Adelman, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 18/295,290

(22) Filed: Apr. 4, 2023

(65) Prior Publication Data

US 2023/0243384 A1 Aug. 3, 2023

Related U.S. Application Data

(63) Continuation of application No. 17/097,335, filed on Nov. 13, 2020, now Pat. No. 11,629,749.

(60) Provisional application No. 63/054,113, filed on Jul. 20, 2020.

(51) Int. Cl.
*F16B 45/02* (2006.01)
*A44B 15/00* (2006.01)

(52) U.S. Cl.
CPC .............. *F16B 45/02* (2013.01); *A44B 15/00* (2013.01)

(58) Field of Classification Search
CPC ...... F16B 45/02; F16B 45/036; F16B 45/023; F16B 45/008; A44B 15/00
See application file for complete search history.

(56) References Cited

U.S. PATENT DOCUMENTS

| | | | |
|---|---|---|---|
| 5,005,266 A | | 4/1991 | Fister et al. |
| 6,421,888 B1 | | 7/2002 | Grenga et al. |
| 6,601,274 B2 | | 8/2003 | Gartsbeyn |
| D577,574 S | * | 9/2008 | Liang .............. D8/367 |
| D626,393 S | * | 11/2010 | Ormsbee .......... D8/18 |
| 7,946,006 B2 | * | 5/2011 | Thompson ...... F16B 45/023 24/601.5 |
| D702,110 S | | 4/2014 | Gobbi |
| D732,937 S | * | 6/2015 | McEvilly ........ D8/367 |
| D735,018 S | * | 7/2015 | McEvilly ........ D8/356 |
| 9,255,602 B2 | * | 2/2016 | Liang ............ F16B 45/036 |
| D775,513 S | * | 1/2017 | Kelleghan ........ D8/356 |

(Continued)

FOREIGN PATENT DOCUMENTS

| | | |
|---|---|---|
| DE | 8135205 U1 | 4/1982 |
| JP | 2015516546 A | 6/2015 |

OTHER PUBLICATIONS

International Search Report and Written Opinion dated Nov. 19, 2021 issued in PCT App. No. PCT/US2021/055812 (8 pages).

(Continued)

*Primary Examiner* — David M Upchurch
(74) *Attorney, Agent, or Firm* — Potomac Law Group, PLLC

(57) ABSTRACT

A carabiner includes a carabiner body having a first opening, a first gate coupled to the carabiner body, the first gate configured to open and close the first opening, and a second gate coupled to the carabiner body, the second gate, when closed, defining a first area and a second area and, when opened, providing a second opening to the second area. The first gate, when opened, provides a first opening to the first area. The first gate is configured to open via rotation in a first rotational direction and the second gate is configured to open via rotation in the first rotational direction.

20 Claims, 24 Drawing Sheets

(56) References Cited

U.S. PATENT DOCUMENTS

| | | | | |
|---|---|---|---|---|
| D785,316 S | * | 5/2017 | Grossman | D8/356 |
| D785,317 S | * | 5/2017 | Grossman | D8/356 |
| D807,734 S | * | 1/2018 | Gobbi | D8/356 |
| D811,838 S | * | 3/2018 | Enrico | D8/34 |
| D854,916 S | * | 7/2019 | Derr | D8/356 |
| D861,327 S | * | 10/2019 | Osmanski | D3/207 |
| 2003/0097737 A1 | | 5/2003 | Gartsbeyn | |
| 2011/0113604 A1 | * | 5/2011 | Chu | F16B 45/02 24/601.5 |
| 2013/0247339 A1 | * | 9/2013 | Wurzer | F16B 45/023 24/600.1 |
| 2014/0373320 A1 | * | 12/2014 | Nemec | A63B 29/02 24/599.6 |
| 2016/0255918 A1 | * | 9/2016 | Grossman | A44B 15/00 |
| 2016/0341239 A1 | * | 11/2016 | Inkavesvaanit | F16B 45/036 |
| 2018/0056134 A1 | * | 3/2018 | Chu | F16B 45/04 |
| 2020/0222732 A1 | | 7/2020 | Rutkowski et al. | |

OTHER PUBLICATIONS

Extended European Search Report for European Application No. 21892549.3 dated Aug. 2, 2024.

* cited by examiner

SYSTEMS AND METHODS FOR A KEY OPTIMIZED DOUBLE GATED CARABINER

CROSS REFERENCE TO RELATED APPLICATIONS

This application is a continuation of U.S. patent application Ser. No. 17/097,335, filed Nov. 13, 2020, which claims priority to U.S. Provisional Patent Application No. 63/054,113 filed Jul. 20, 2020. These applications are hereby incorporated by reference.

BACKGROUND

In various scenarios, connectors are useful for hikers, fishermen, outdoorsmen, travelers, and a variety of other users. Carabiners may be used to tie objects down, connect one object to another, and find a very wide variety of uses. In many scenarios, users utilize such carabineers for holding keys or other items. In many scenarios, the security of the keys or other objects on the device is at issue as is the usability of the device.

SUMMARY

In one embodiment, a carabiner includes a carabiner body having a first opening, a first gate coupled to the carabiner body, the first gate configured to open and close the first opening, and a second gate coupled to the carabiner body, the second gate, when closed, defining a first area and a second area and, when opened, providing a second opening to the second area. The first gate, when opened, provides a first opening to the first area. The first gate is configured to open via rotation in a first rotational direction and the second gate is configured to open via rotation in the first rotational direction.

In one embodiment, a carabiner apparatus includes a carabiner body, the carabiner body having a first portion and a second portion, the first and second portion defined by a G-arm, the first portion including a carabiner opening, the G-arm adjacent to the carabiner opening. The carabiner apparatus further includes a first gate, the first gate oriented to close and open the carabiner opening. The carabiner apparatus further includes a second gate, the second gate extending from the G-arm to a portion of the carabiner body, the second gate when closed separating the first portion of the carabiner body from the second portion of the carabiner body. In one alternative, the first gate opens inward on the carabiner body in a first rotational direction. Alternatively, the second gate opens in the first rotation direction and closes in a direction opposite the first rotational direction. In another alternative, the carabiner body includes a stop that prevents the second gate from rotating past a point in the direction opposite the first rotational direction. Alternatively, the carabiner body includes a cutout that allows the second gate to rotate in the first rotational direction. In another alternative, the stop and the cutout form a divot in the carabiner body. Alternatively, the carabiner body is shaped such that a first ring is slidable on the carabiner body from the carabiner opening through the first portion, past the divot, to the second portion. In another alternative, the second ring sliding past the divot pushes the second gate in the first rotational direction. Alternatively, a second ring in the second portion of the carabiner body, when slid towards the carabiner opening, pushes against the second gate in a second rotational direction opposite the first rotational direction. In another alternative, the stop prevents the second gate from rotating in the second rotational direction. Alternatively, the carabiner body is approximately oval-shaped and the G-arm extends from one side of the carabiner body towards an opposite side of the carabiner body. In another alternative, the carabiner body including the G-arm has a G-shape.

In one embodiment, a carabiner includes a carabiner body, the carabiner body having a first portion and a second portion, the first portion including a carabiner opening. The carabiner further includes a first gate, the first gate oriented to close and open the carabiner opening. The carabiner further includes a second gate, the second gate, when closed, separating the first portion of the carabiner body from the second portion of the carabiner body. In one alternative, the second gate is mounted proximate to the carabiner opening in relation to the carabiner body. In another alternative, the carabiner body includes an inwardly extending portion, the second gate mounted on the inwardly extending portion. Alternatively, the carabiner body includes a mounting area for the second gate. In another alternative, the mounting area is a G-Arm. Alternatively, the mounting area is an area of additional body material to accommodate mounting of the second gate.

In one embodiment, a method of using a carabiner includes providing a carabiner. The carabiner apparatus includes a carabiner body, the carabiner body having a first portion and a second portion, the first and second portion defined by a G-arm, the first portion including a carabiner opening, the G-arm adjacent to the carabiner opening. The carabiner further includes a first gate, the first gate oriented to close and open the carabiner opening. The carabiner further includes a second gate, the second gate extending from the G-arm to a portion of the carabiner body, the second gate when closed separating the first portion of the carabiner body from the second portion of the carabiner body. The method further includes sliding a key onto the carabiner body while using the key to open the first gate into the first portion. The method further includes sliding the key around the carabiner body. The method further includes using the key to open the second gate. The method further includes sliding the key into the second portion. In one alternative, the method further includes manually opening the second gate and sliding the key into the first portion.

DETAILED DESCRIPTION

Certain terminology is used herein for convenience only and is not to be taken as a limitation on the embodiments of a key optimized double gated carabiner ("G-Biner"). The carabiner is referred to as a G-Biner herein, however the device is not limited to a device having a G shape. In many embodiments, G-Biners include two gates and a biner (carabiner) frame. The two gates are oriented such that the hole of a key, a ring, object with an aperture, or other object having a ring-like shape (although the shape need not be circular) (collectively rings). Alternatively, this may include a rope/cord/etc. having an aperture or really anything having an aperture. For instance, embodiments of the G-Biner may be used with or incorporated into the loops of cords and ropes and be used to tie down objects like tents strings, tarps etc. Any device may benefit from the G-Biner or a device may open the gates when slid onto the carabiner frame and resists opening when the rings are slid the other way.

Figure 1:
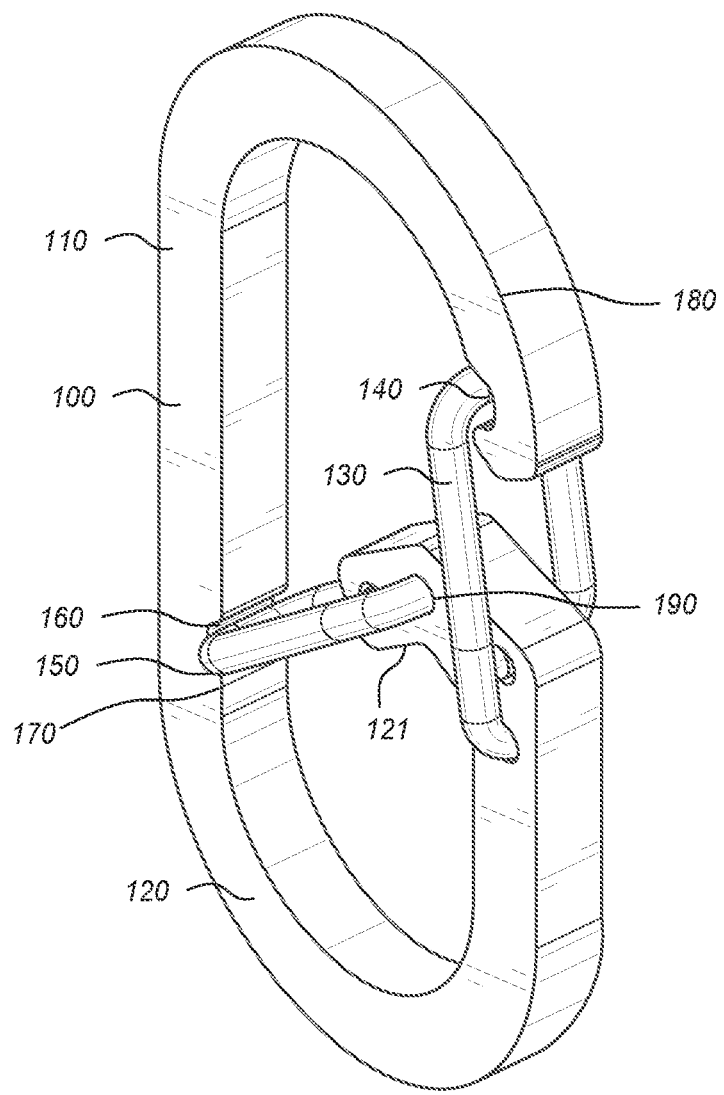
FIG. 1 shows one embodiment of a G-Biner.

FIG. 1 shows one embodiment of a G-Biner 100. G-Biner 100 is formed to have a carabiner body. Typically, is body is formed of metal, composite, plastic, or other material. G-Biner 100 includes a top carabiner area 110 and a bottom carabiner area 120. G-Biner 100 includes a first gate 130. First gate 130 interfaces with the top carabiner area 110 at rest 140. G-Biner 100 includes a second gate 150. Second gate 150 rests against stop 160. The opposite side of stop 160 includes a cutout 170, which allows the second gate to flex downwards. G-Biner 100 also includes g-arm 121. In some embodiments, g-arm 121 may be removed and the second gate 150 may merely attach to the carabiner body below the attachment point of the first gate. In this case there may effectively be no g-arm. In alternatives, g-arm 121 may be increased in length or size. In some alternatives, the thickness of the carabiner body may accommodate keys and the apertures they contain. In other alternatives, the carabiner body may be made thicker as to not accommodate keys. Various variations in size and other all shape may be used.

In operation, a ring or a key with an aperture may push gate 130 inward. Then the ring or key with aperture may slide over and around body hook portion 180. The ring or key with aperture may then slide to gate 150. The continuous slide of the ring or key with aperture will then push down second gate 150 and slide into the bottom carabiner area 120. Once the ring or key with aperture is located in the bottom carabiner area 120, the ring or key with aperture may not backslide past second gate 150 without a user pushing the second gate 150 downwards before sliding the ring or key with aperture. In this way, keys or other objects may be quickly trapped and placed beyond second gate 150 in bottom carabiner area 120 in a relatively secure configuration. Thereafter, the top carabiner area may be clipped via the first gate to a belt loop or other object. In this way rings or keys with apertures may be loaded quickly to the G-Biner 100, without fear that the keys will be unintentionally released from the bottom carabiner area 120. And in a general way the rings or keys would have to pass by 2 gates, instead of the one gate in a typical carabiner to escape or be lost.

In the embodiment shown, G-Biner 100 includes an approximately oval shape with G-Arm 190 tilting inwards. G-Arm 190 provides an area for second gate 150 to be internally mounted. In alternatives, the G-Biner need not be G-shaped. The main principles of many embodiments include the inclusion of two gates that open in the same slide direction and resist opening in the opposite slide direction of a ring or key on the G-Biner. Further, many embodiments include two carabiner attachment areas, and outer (or top) area and an inner (or bottom) area.

Figure 2:
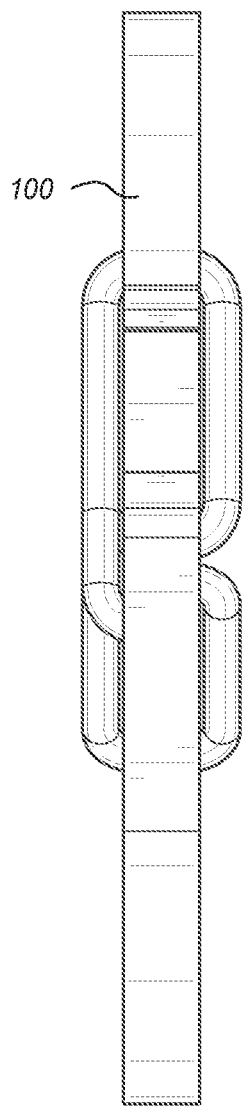
FIGS. 2 and 3 shows the left and right side views of the G-Biner of FIG. 1.
Figure 3:
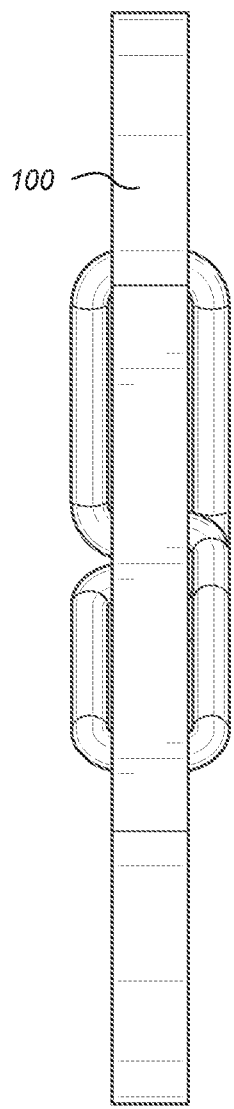
Figure 4:
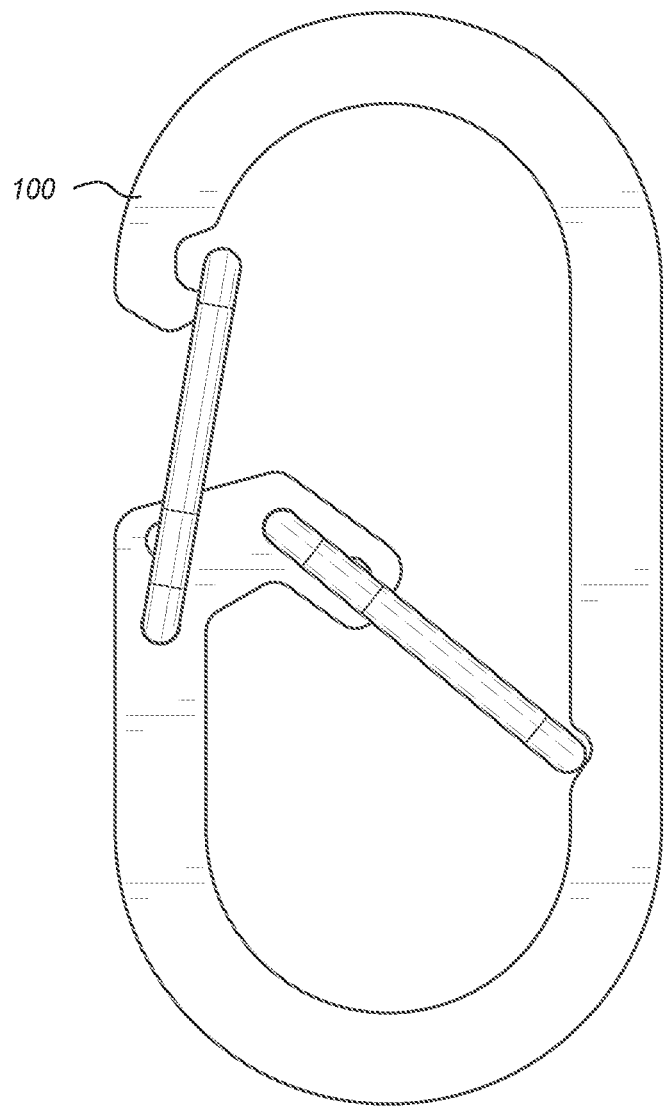
FIG. 4 shows a front view of the G-Biner of FIG. 1.
Figure 5:
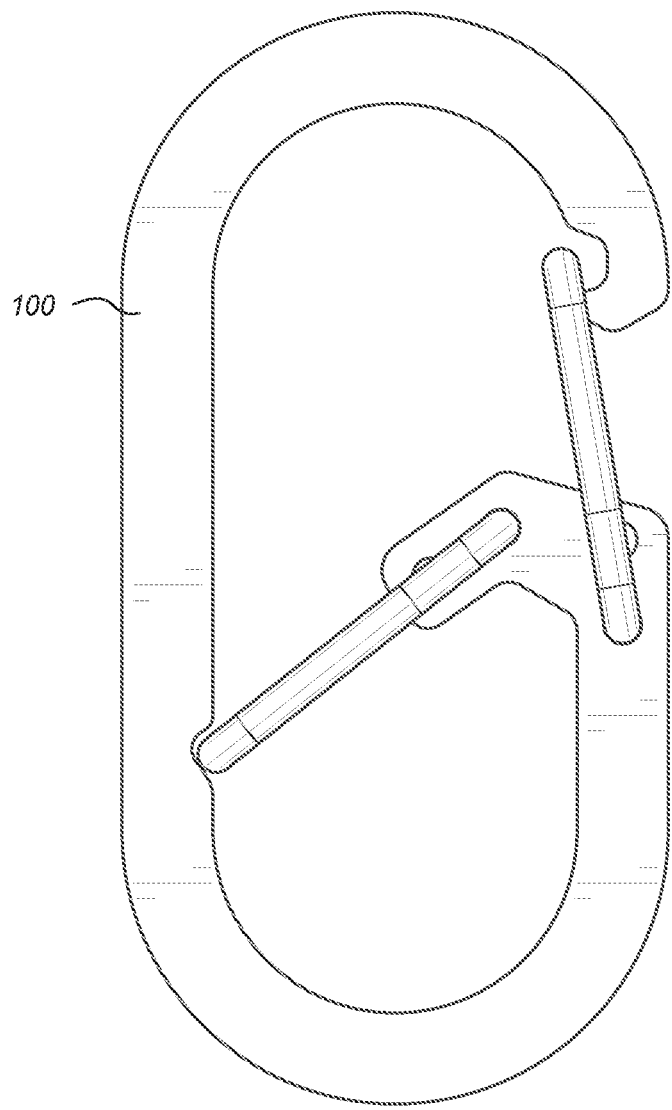
FIG. 5 shows a rear view of the G-Biner of FIG. 1.
Figure 6:
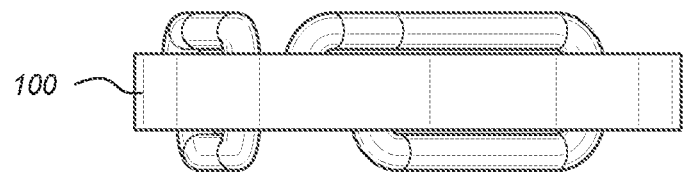
FIGS. 6 and 7 shows the bottom and top views of the G-Biner of FIG. 1.
Figure 7:
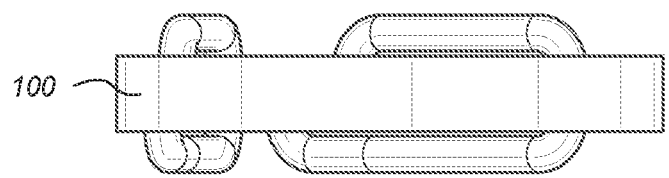
Figure 8:
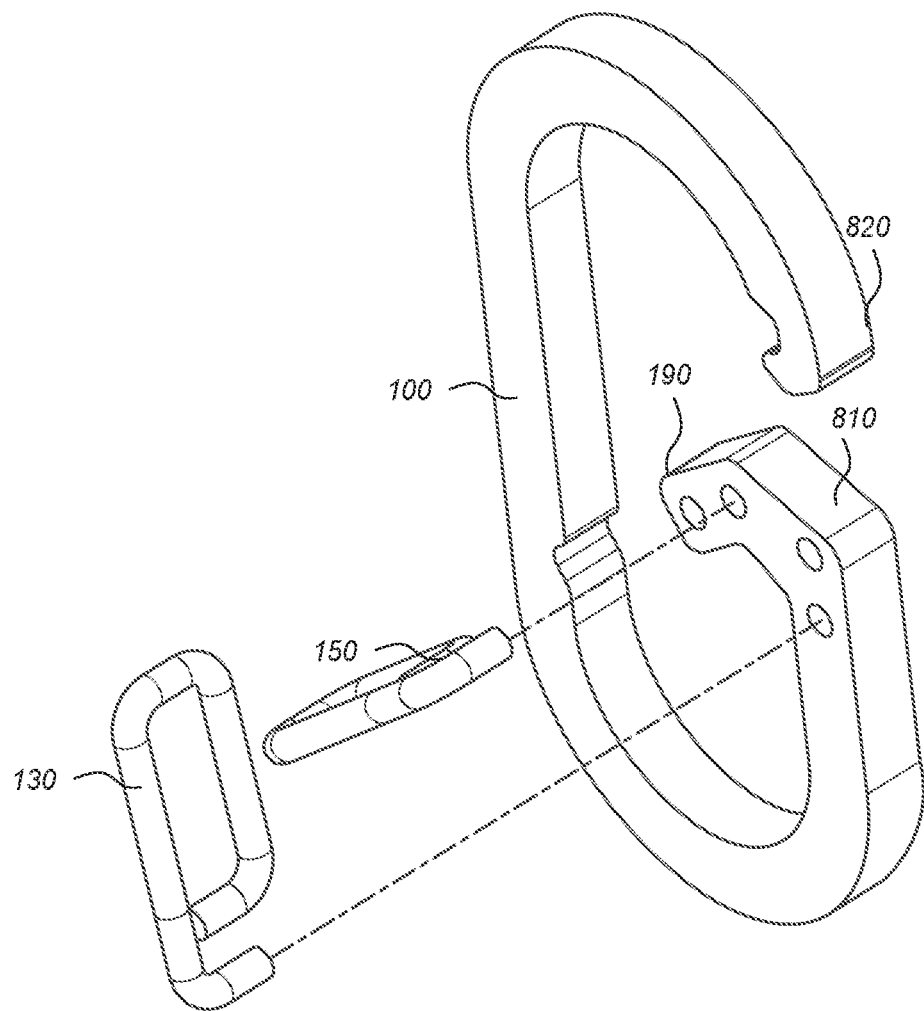
FIG. 8 shows the G-Biner of FIG. 1 with the gates removed.

FIGS. 2 and 3 show the left and right side views of G-Biner 100. FIG. 4, shows a front view of G-Biner 100. FIG. 5 shows a rear view of G-Biner 100. FIGS. 6 and 7 show bottom and top views of G-Biner 100. FIG. 8 shows G-Biner 100 with gates 130, 150 removed. In this view, G-Arm 190 is clearly visible and the mounting holes for gate 150 are shown. G-Arm 190 provides for an attachment area, without interfering with the operation of gate 130. If the cross portion 810 of G-Arm 190 is inclined too far towards hook area 820, then gate 130 may not function normally (or at least enough for the gate to sufficiently open).

Figure 9:
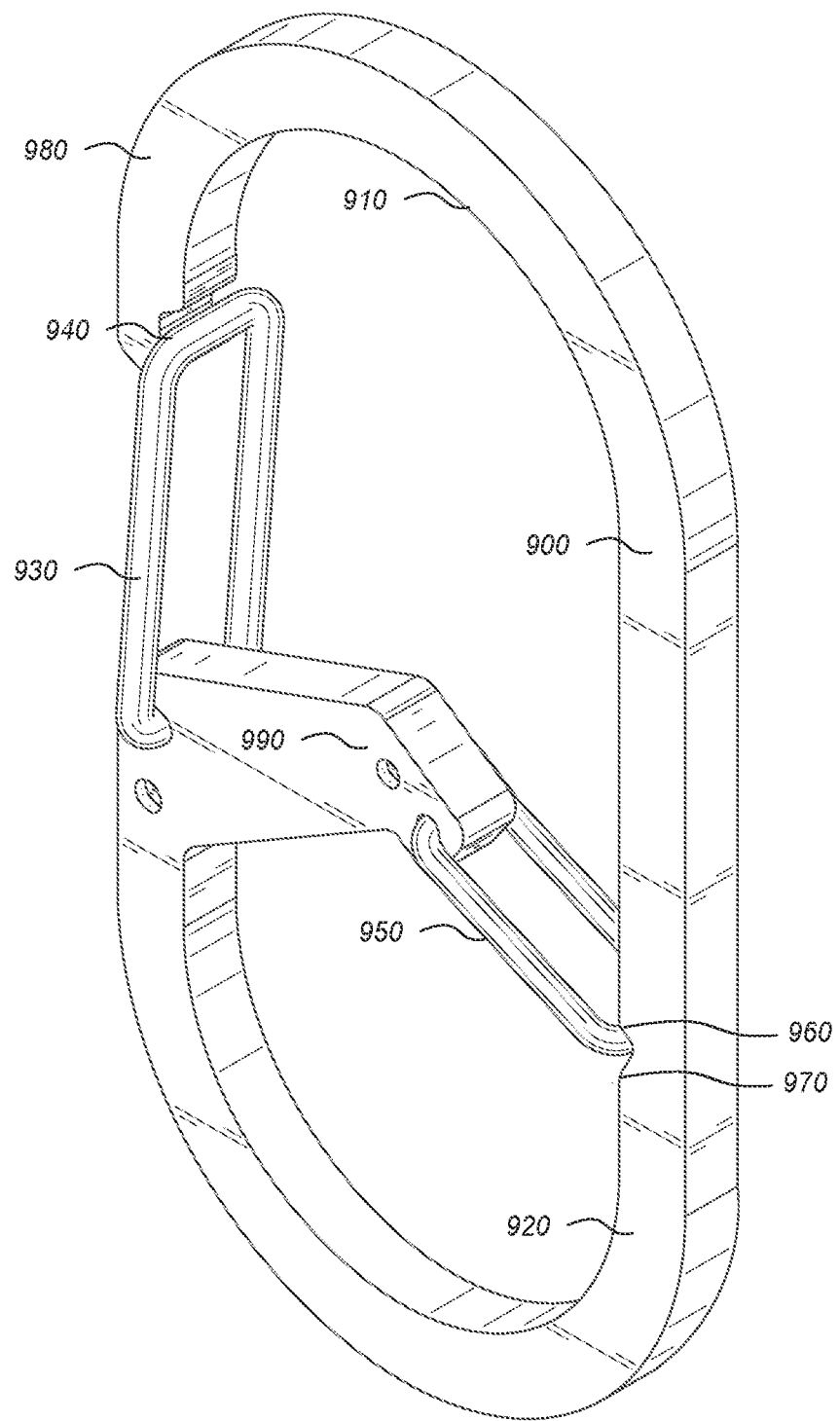
FIG. 9 shows one embodiment of a G-Biner.

FIG. 9 shows another embodiment of a G-Biner 900. G-Biner 900 is a greater size than G-Biner 100 typically. Therefore, the G-Arm 990 may be longer. G-Biner 900 is formed to have a carabiner body. Typically, is body is formed of metal, composite, plastic, or other material. G-Biner 900 includes a top carabiner area 110 and a bottom carabiner area 920. G-Biner 900 includes a first gate 930. First gate 930 interfaces with the top carabiner area 910 at rest 940. G-Biner 900 includes a second gate 950. Second gate 950 rests against stop 960. The opposite side of stop 960 includes a cutout 970, which allows the second gate to flex downwards.

In operation, a ring or a key with an aperture may push gate 930 inward. Then the ring or key with aperture may slide over and around body hook portion 980. The ring or key with aperture may then slide to gate 950. The continuous slide of the ring or key with aperture will then push down second gate 950 and slide into the bottom carabiner area 920. Once the ring or key with aperture is located in the bottom carabiner area 920, the ring or key with aperture may not backslide past second gate 950 without a user pushing the second gate 950 downwards before sliding the ring or key with aperture. In this way, keys or other objects may be quickly trapped and placed beyond second gate 950 in bottom carabiner area 920 in a relatively secure configuration. Thereafter, the top carabiner area may be clipped via the first gate to a belt loop or other object. In this way rings or keys with apertures may be loaded quickly to the G-Biner 900, without fear that the keys will be unintentionally released from the bottom carabiner area 920.

In the embodiment shown, G-Biner 900 includes an approximately oval shape with G-Arm 990 tilting inwards. G-Arm 990 provides an area for second gate 950 to be internally mounted. In alternatives, the G-Biner need not be G-shaped. The main principles of many embodiments include the inclusion of two gates the open in the same slide direction and resist opening in the opposite slide direction of a ring or key on the G-Biner. Further, many embodiments include two carabiner attachment areas, and outer (or top) area and an inner (or bottom) area.

Figure 10:
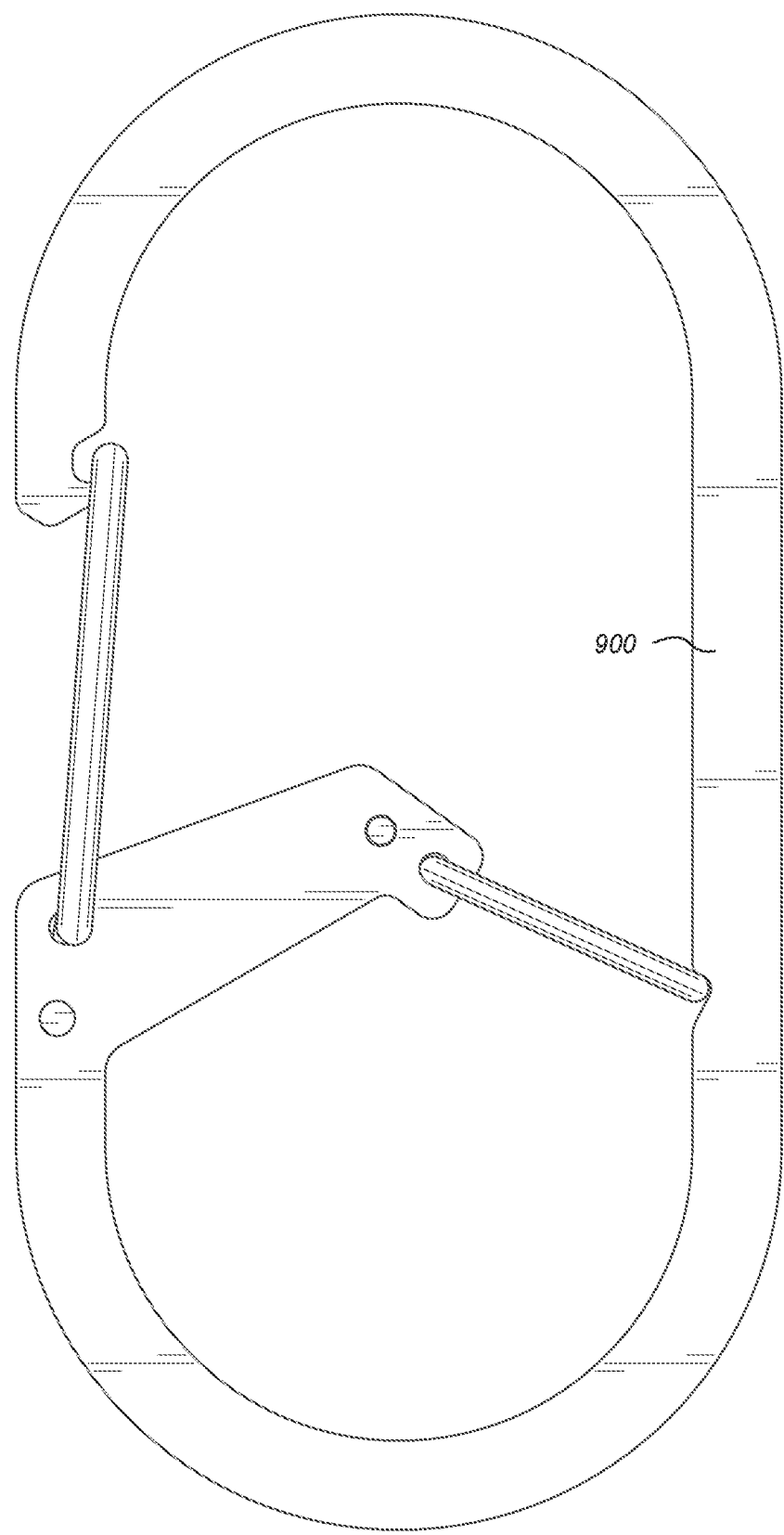
FIG. 10 shows a front view of the G-Biner of FIG. 9.
Figure 11:
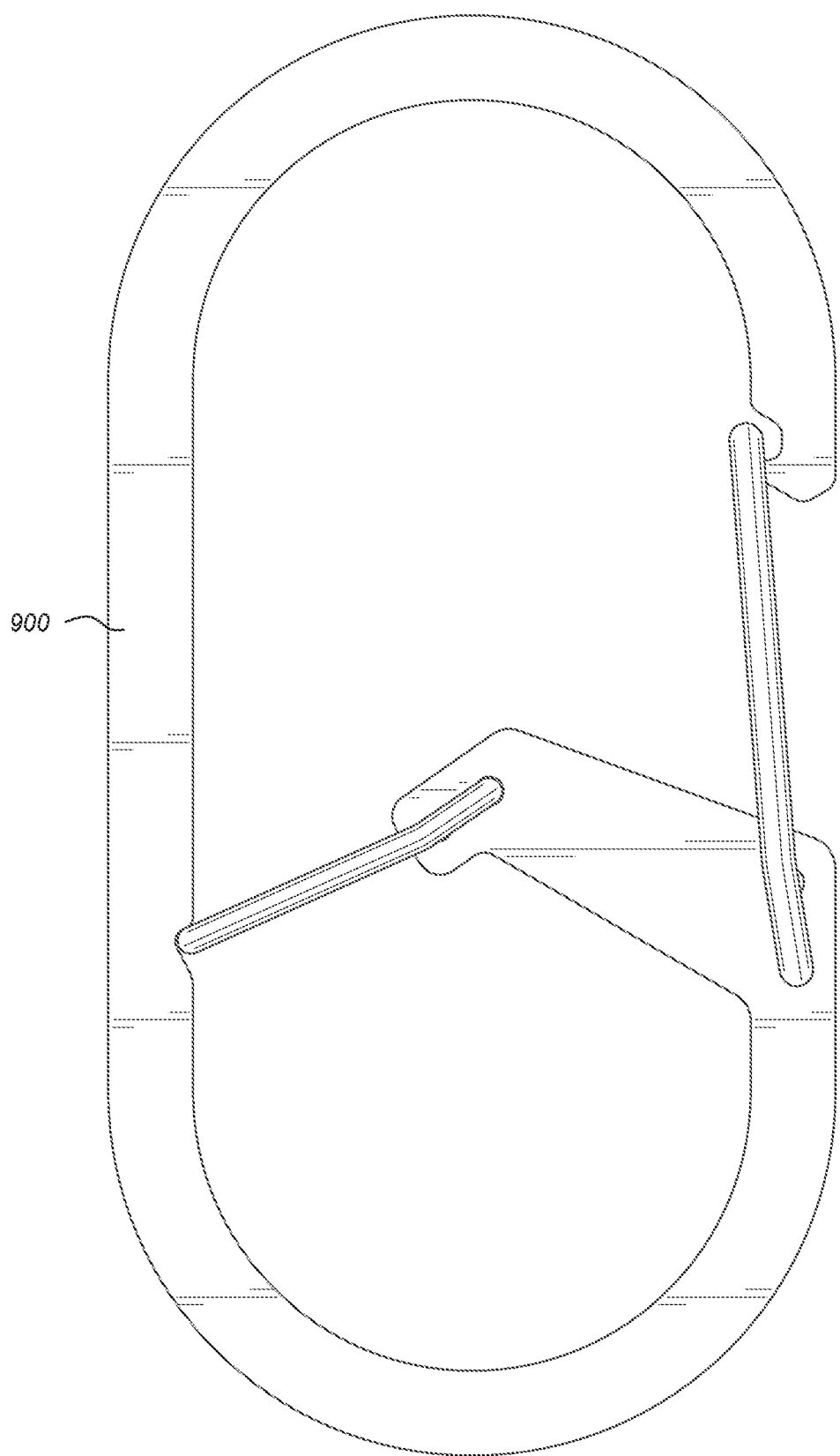
FIG. 11 shows a rear view of the G-Biner of FIG. 9.
Figure 12:
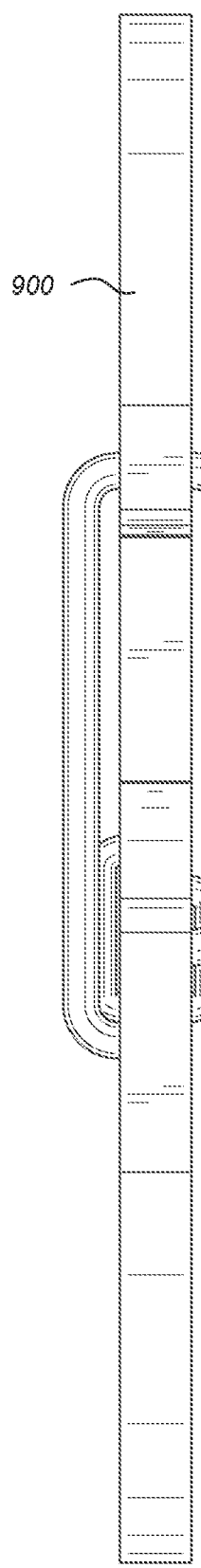
FIGS. 12 and 13 shows the left and right side views of the G-Biner of FIG. 9.
Figure 13:
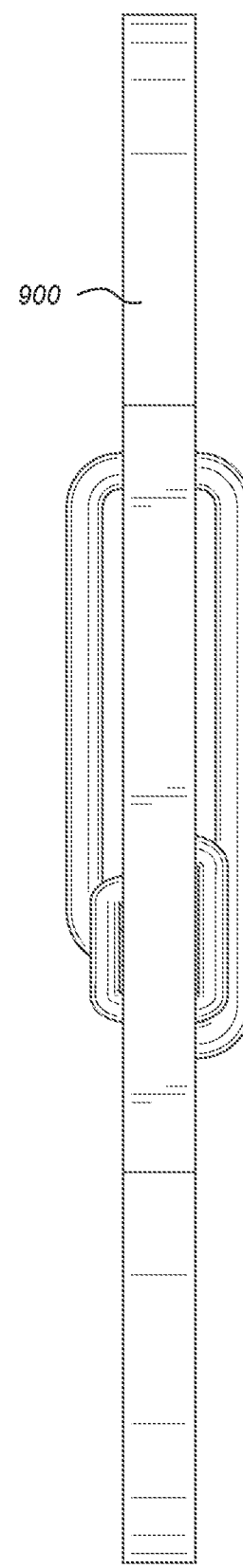
Figure 14:
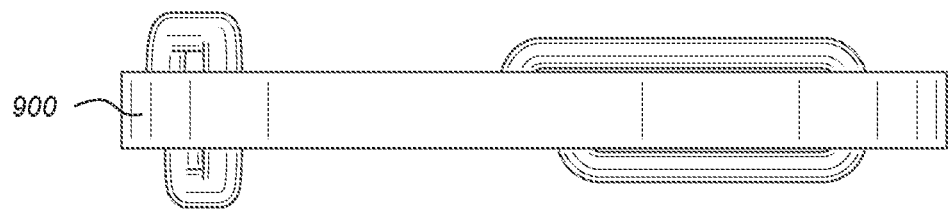
FIGS. 14 and 15 show bottom and top views of the G-Biner of FIG. 9.
Figure 15:
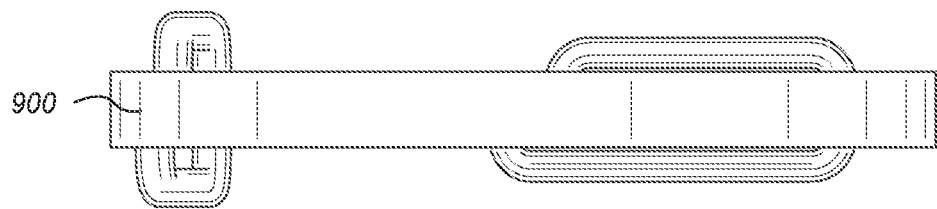
Figure 16:
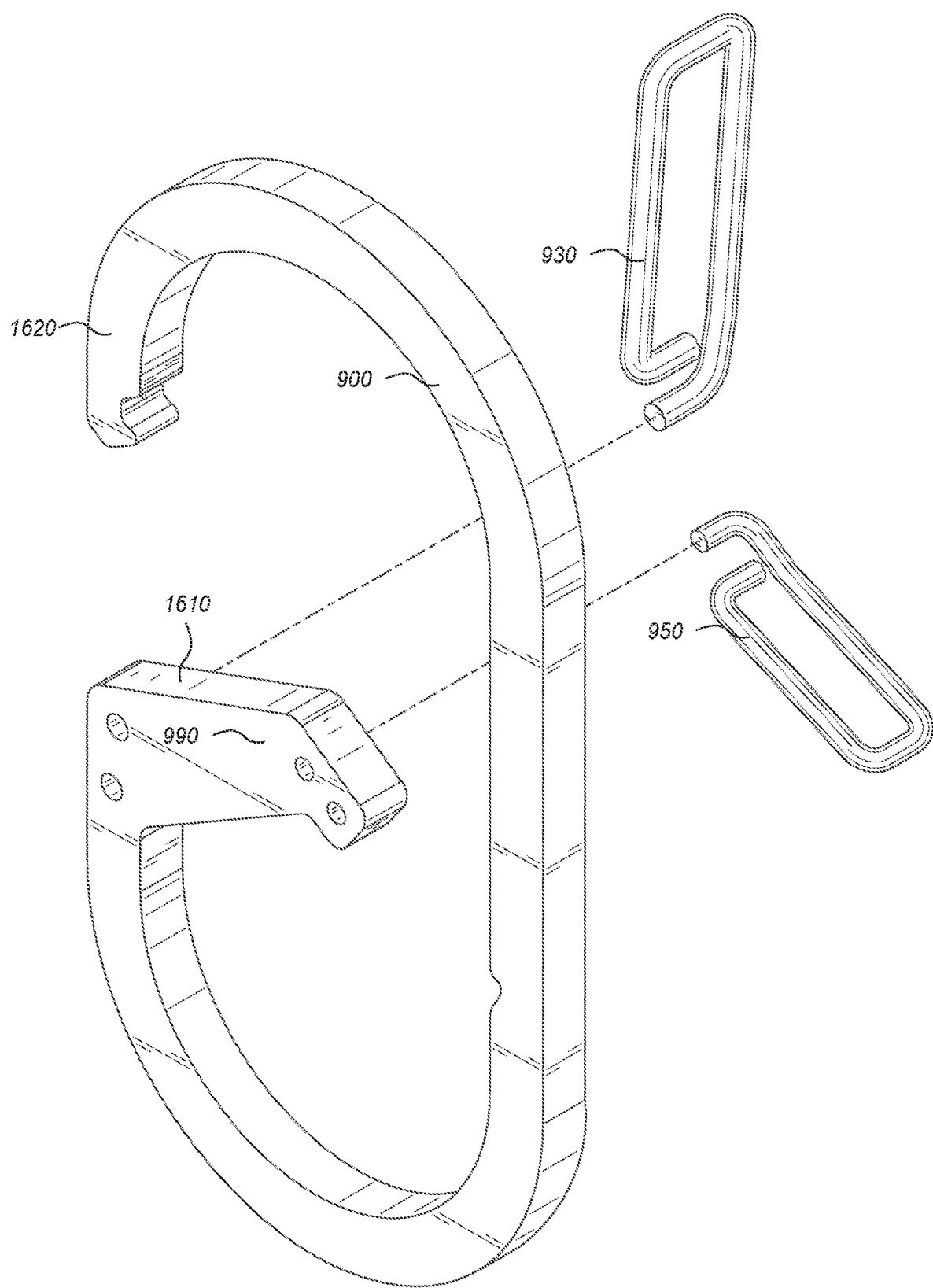
FIG. 16 shows the G-Biner of FIG. 9 with the gates removed.
Figure 17:
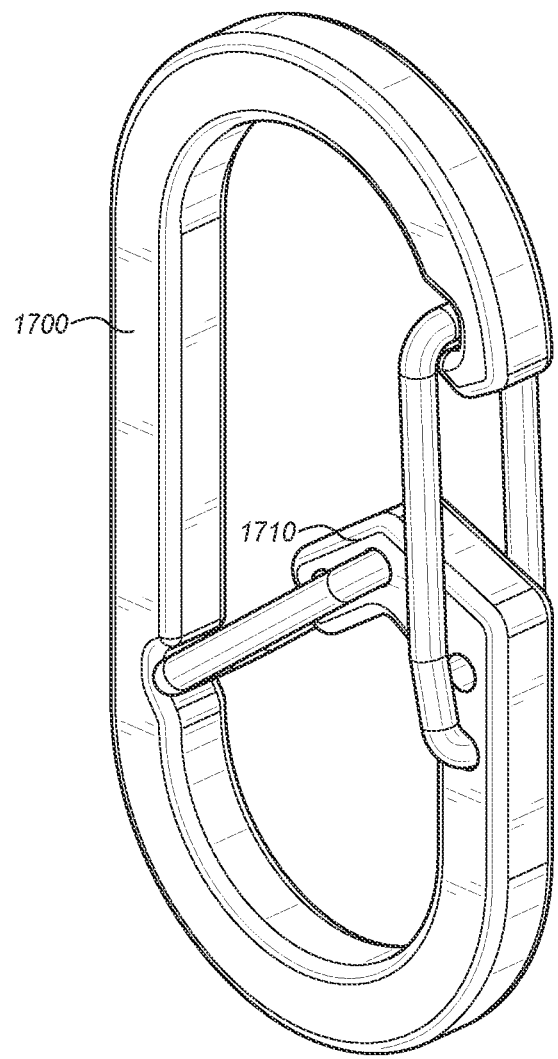
FIGS. 17-24 show one embodiment of a G-Biner.

FIGS. 10 and 11 show the front and rear side views of G-Biner 900. FIG. 12, shows a left side view of G-Biner 900. FIG. 13 shows a right side view of G-Biner 900. FIGS. 14 and 15 show the bottom and top views of G-Biner 900. FIG. 16 shows G-Biner 900 with gates 930, 950 removed. In this view, G-Arm 990 is clearly visible and the mounting holes for gate 950 are shown. G-Arm 990 provides for an attachment area, without interfering with the operation of gate 930. If the cross portion 1610 of G-Arm 990 is inclined too far towards hook area 1620, then gate 930 may not function normally (or at least enough for the gate to sufficiently open).

Figure 18:
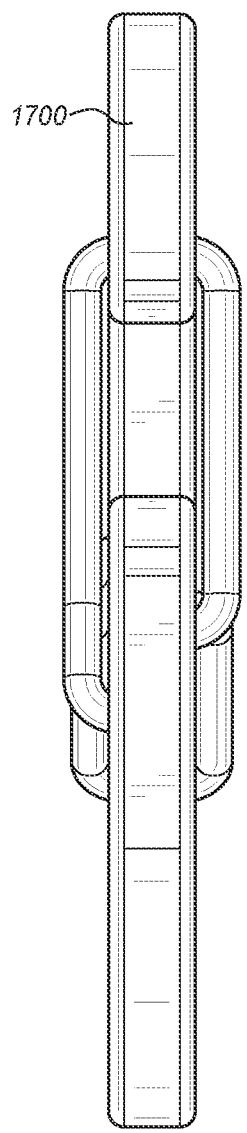
Figure 19:
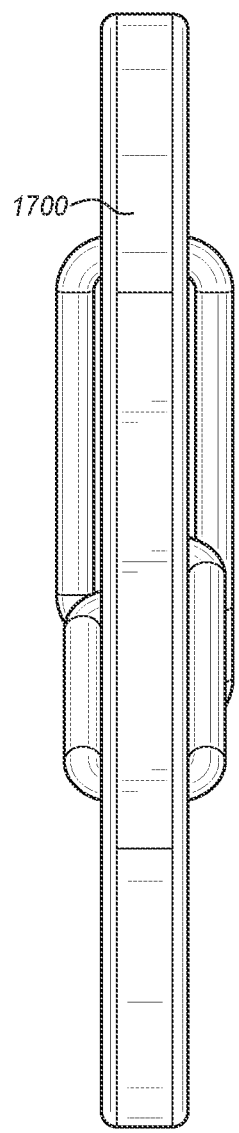
Figure 20:
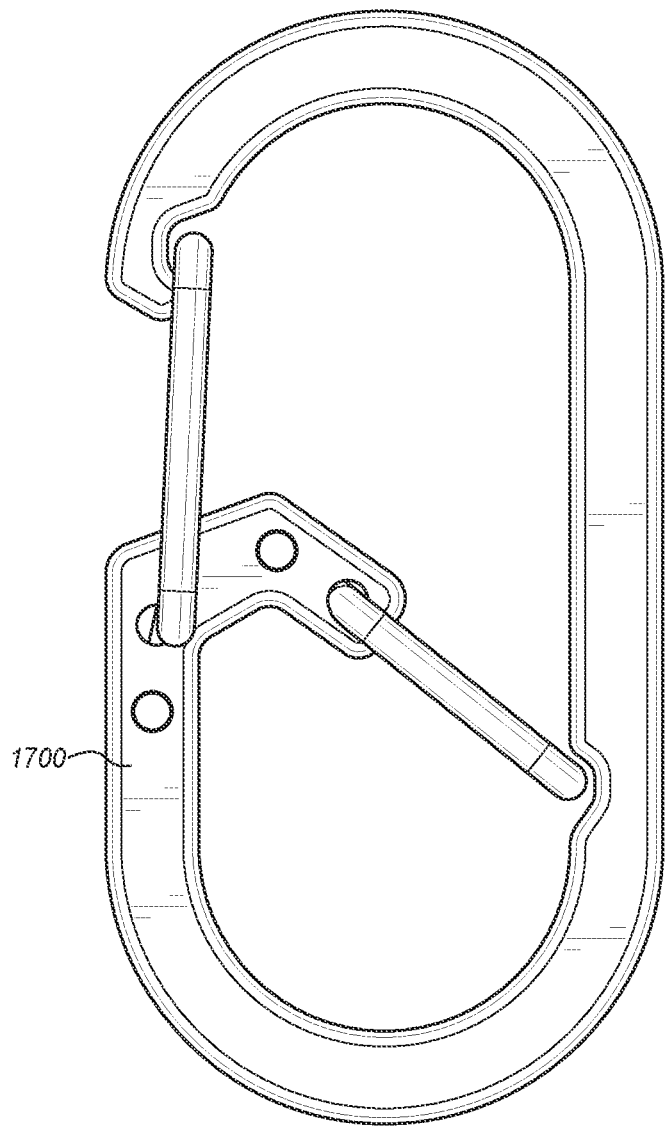
Figure 21:
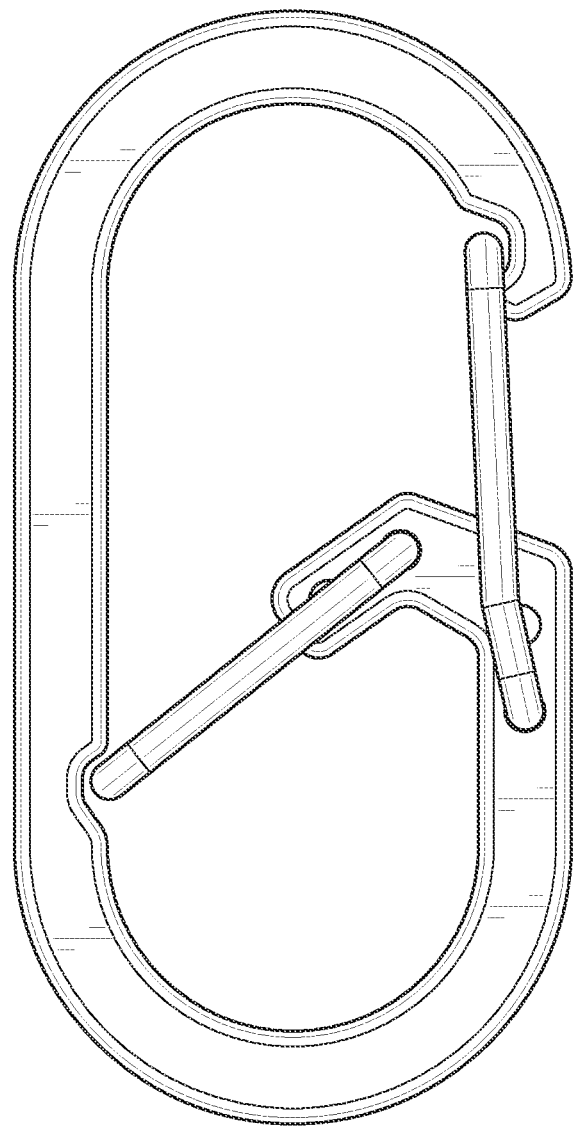
Figure 22:
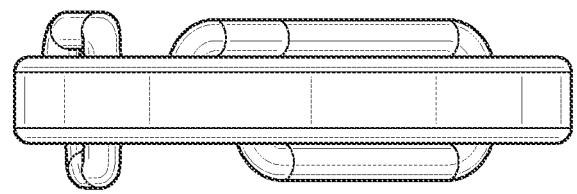
Figure 23:
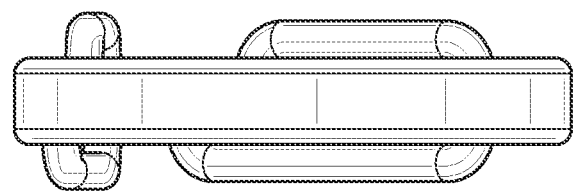
Figure 24:
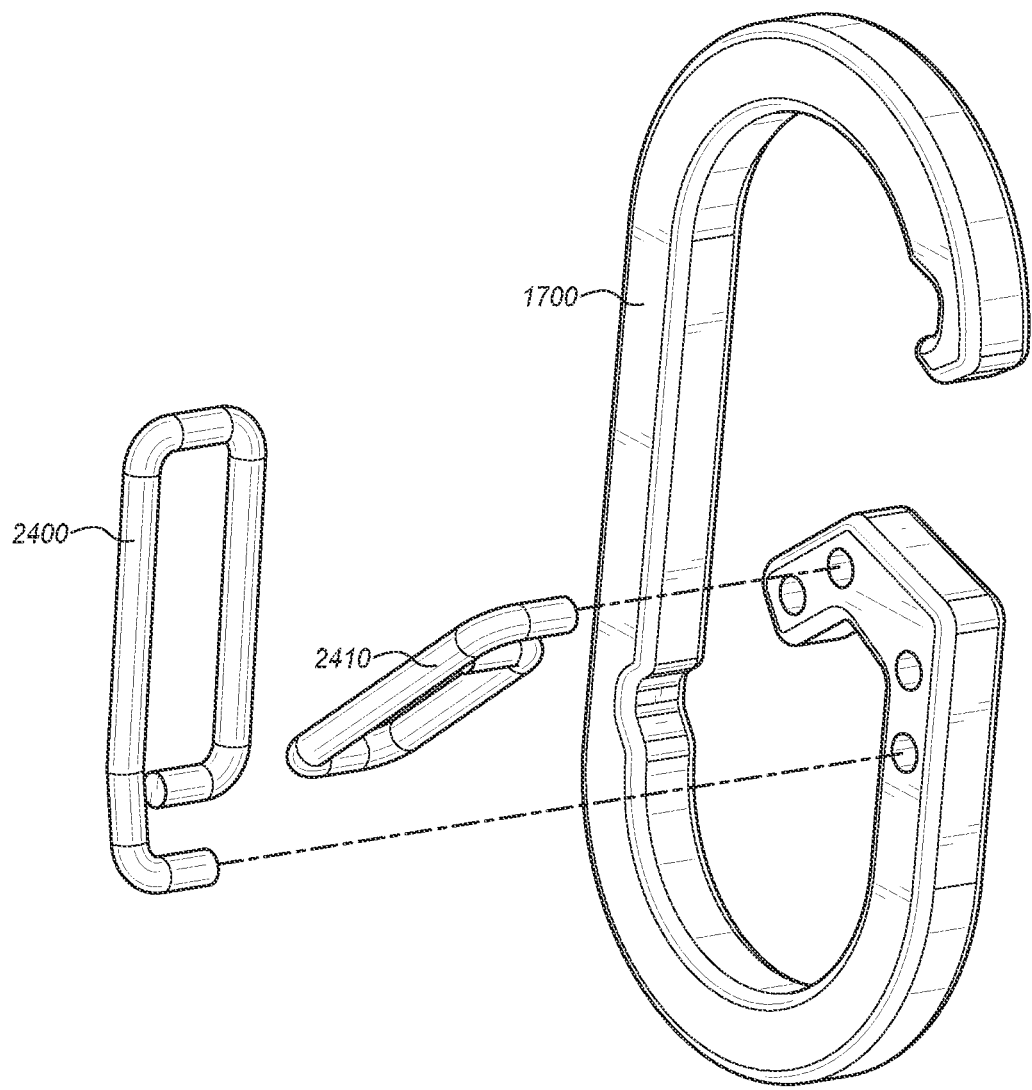
Figure 25:
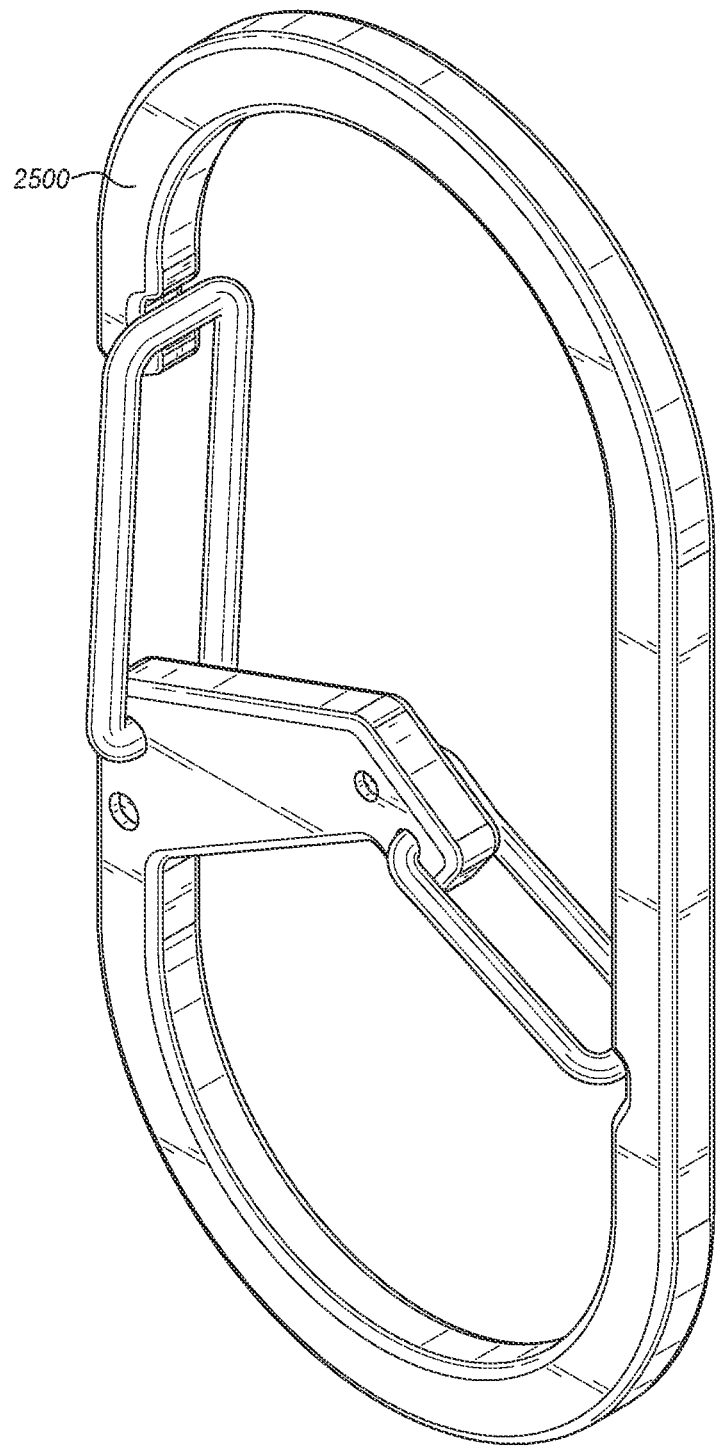
FIGS. 25-32 show another embodiment of a G-Biner.

FIGS. 17-24 show one embodiment of a G-Biner 1700. This embodiment show how dimensions may vary somewhat in appearance, with certain embodiments having shorter G-arms 1710. FIGS. 18 and 19 show the front and rear side views of G-Biner 1700. FIG. 20, shows a left side view of G-Biner 1700. FIG. 21 shows a right side view of G-Biner 1700. FIGS. 22 and 23 show the bottom and top views of G-Biner 1700. FIG. 24 shows G-Biner 1700 with gates 2400, 2410 removed. In this view, G-Arm 1710 is clearly visible and the mounting holes for gate 2410 are shown. G-Arm 1710 provides for an attachment area, without interfering with the operation of gate 2410.

Figure 26:
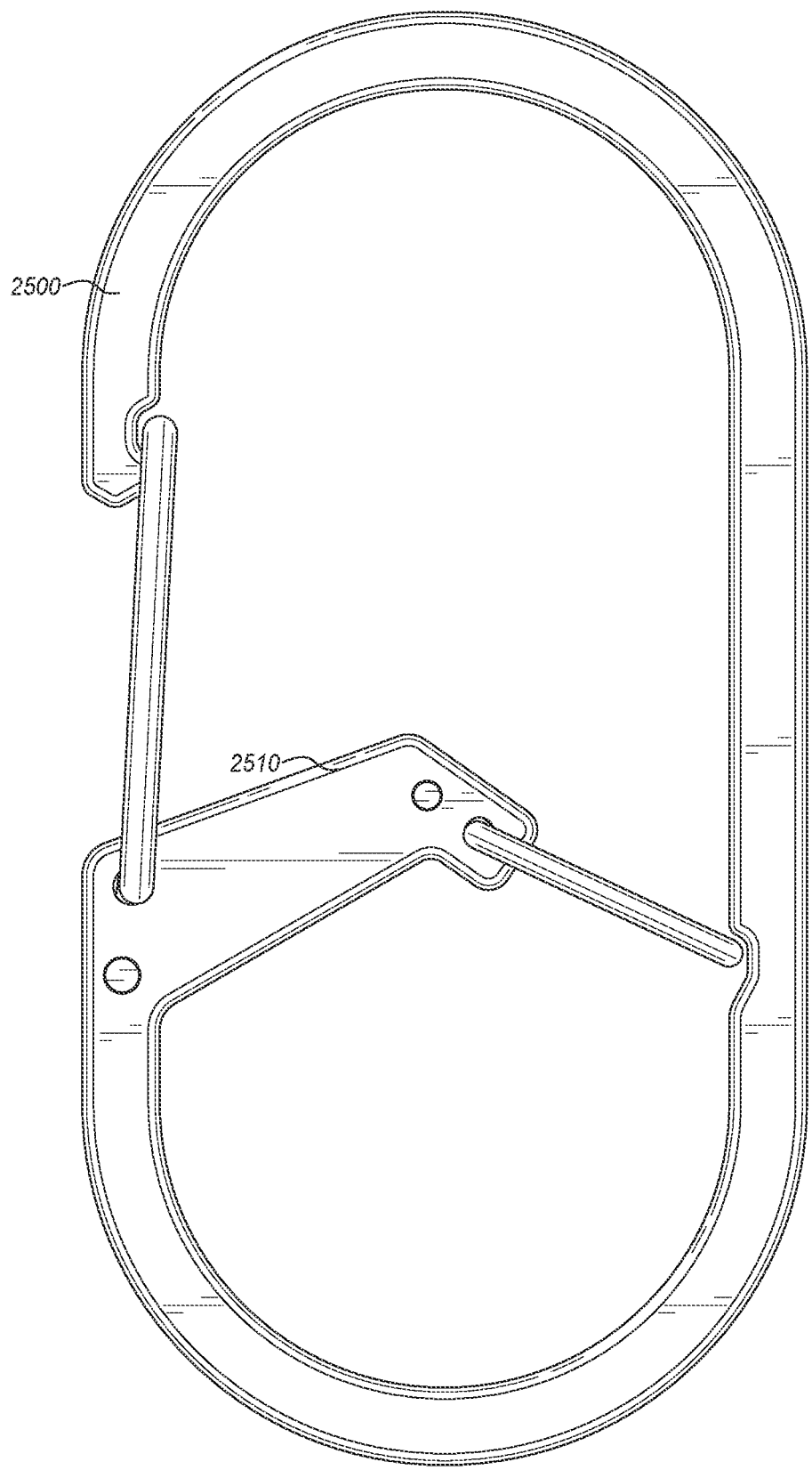
Figure 27:
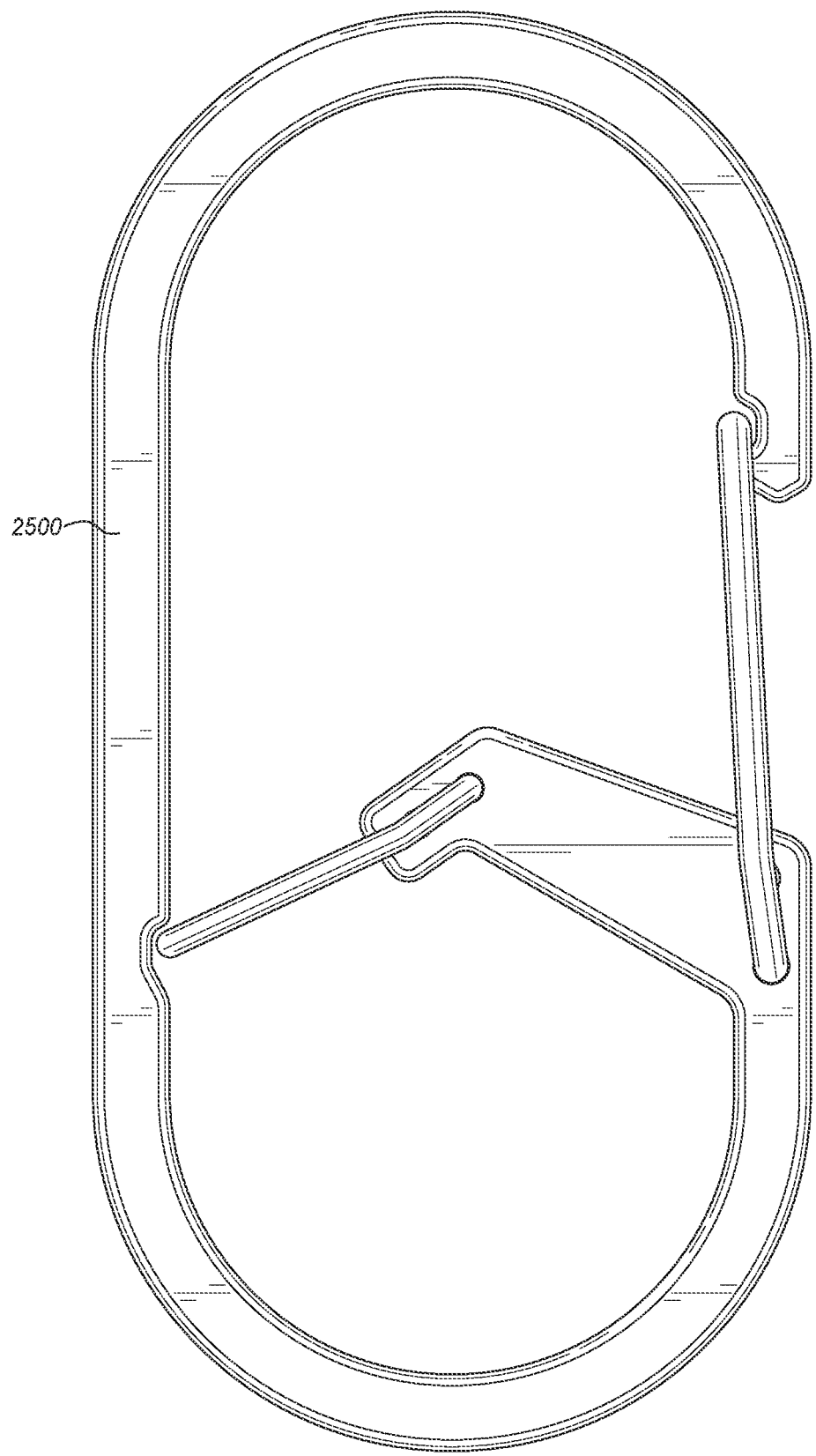
Figure 28:
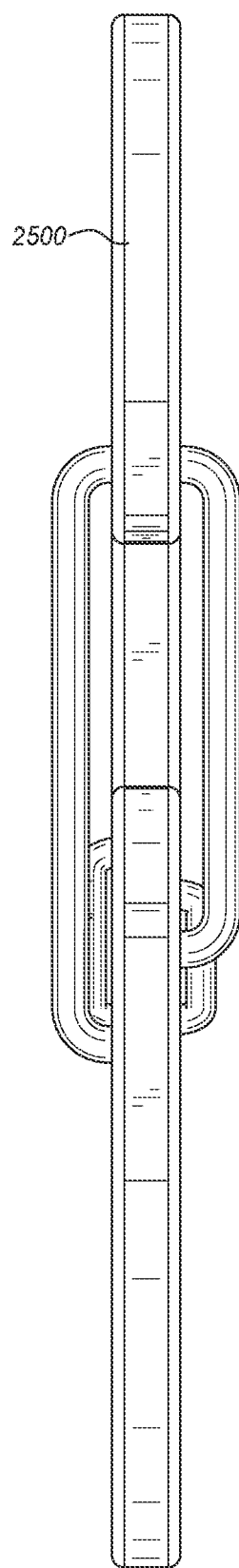
Figure 29:
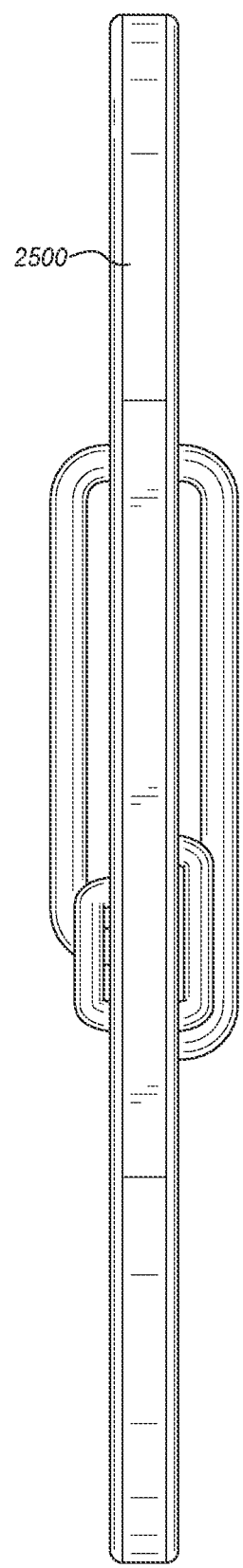
Figure 30:
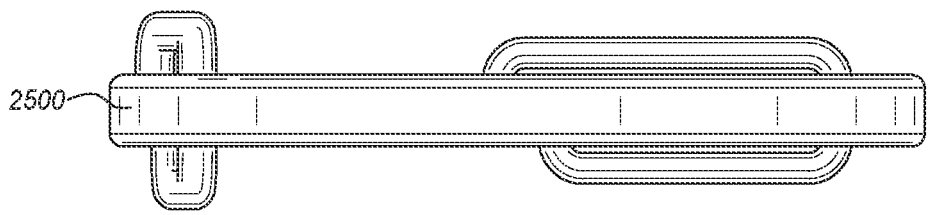
Figure 31:
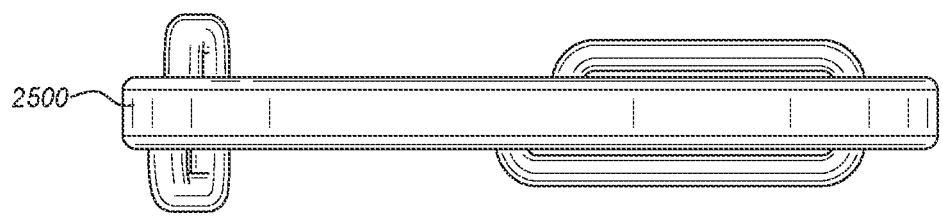
Figure 32:
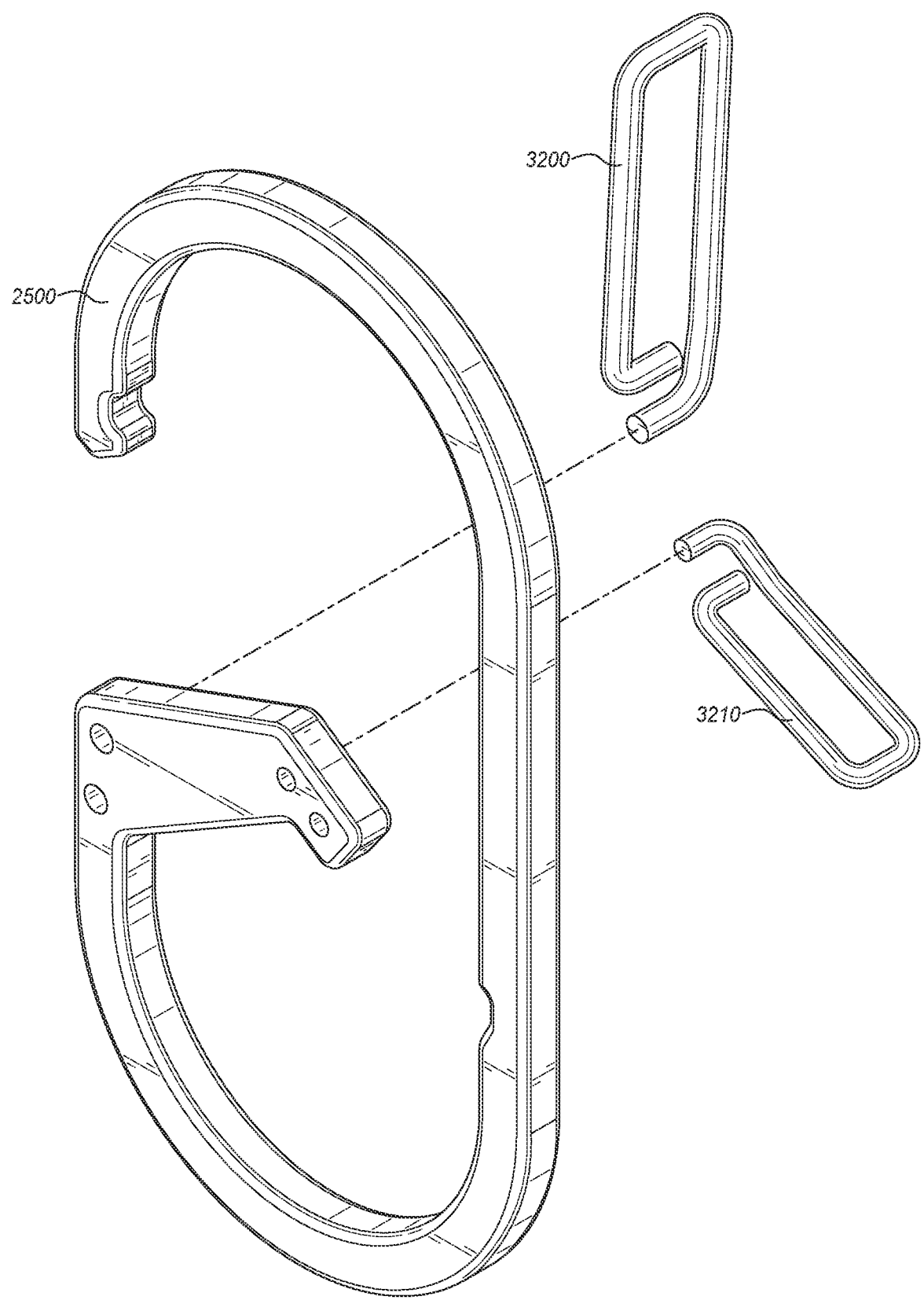

FIGS. 25-32 show one embodiment of a G-Biner 2500. This embodiment show how dimensions may vary somewhat in appearance, with certain embodiments having shorter G-arms 2510. FIGS. 26 and 27 show the front and rear side views of G-Biner 2500. FIG. 28, shows a left side view of G-Biner 2500. FIG. 29 shows a right side view of G-Biner 2500. FIGS. 30 and 31 show the bottom and top views of G-Biner 2500. FIG. 32 shows G-Biner 1700 with gates 3200, 3210 removed. In this view, G-Arm 2510 is clearly visible and the mounting holes for gate 3210 are shown. G-Arm 2510 provides for an attachment area, without interfering with the operation of gate 3210.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A carabiner comprising:
    a carabiner body having a first side and a second side opposite the first side, and a first opening formed on the first side;
    a first gate pivotably coupled to the carabiner body on the first side, the first gate configured to open and close the first opening; and
    a second gate pivotably coupled to the carabiner body, the second gate, when closed, defining a first area and a second area, the second gate, when closed, providing a separator between the first area and the second area that prevents an object from moving between the first area and the second area, and the second gate, when opened, providing a second opening to the second area from the first area, wherein the second gate is configured to be closed via an absence of an external force on the second gate and configured to be opened via a presence of the external force on the second gate;
    wherein the first gate, when opened, provides the first opening to the first area, wherein the first gate is configured to be closed via the absence of the external force on the first gate and configured to be opened via the presence of the external force on the first gate;
    wherein the first gate is configured to open via rotation in a first rotational direction and the second gate is configured to open via rotation in the first rotational direction;
    wherein the first gate, when closed, contacts a first stop located on the first side, and the second gate, when closed, contacts a second stop located on the second side, wherein the first gate is configured to rotate completely independently from the second gate, and the second gate is configured to rotate completely independently from the first gate.

2. The carabiner of claim 1, wherein the first gate opens inwardly on the carabiner body in the first rotational direction.

3. The carabiner of claim 2, wherein the second gate opens inwardly on the carabiner body in the first rotational direction and closes against the second stop in a direction opposite the first rotational direction.

4. The carabiner of claim 3, wherein the carabiner body includes a cutout that allows the second gate to rotate in the first rotational direction.

5. The carabiner of claim 1, wherein the carabiner body comprises a thickness to allow a key comprising an aperture to slide along the carabiner body via the aperture.

6. The carabiner of claim 1, wherein the first gate is pivotably coupled to the carabiner body approximately at a center of the carabiner body adjacent to the first opening or below the center of the carabiner body.

7. The carabiner of claim 6, wherein the second gate is pivotably coupled to the carabiner body on the first side below where the first gate is coupled to the carabiner body.

8. The carabiner of claim 1, further comprising an arm formed by the carabiner body that extends inwardly between the first area and the second area.

9. The carabiner of claim 8, wherein the second gate is pivotably coupled to an inwardly extending portion of the arm.

10. The carabiner of claim 8, wherein the carabiner body, including the arm, forms a G shape.

11. A method of using a carabiner comprising a carabiner body having a first side and a second side opposite the first side, and a first opening formed on the first side, a first gate pivotably coupled to the carabiner body on the first side; the first gate configured to open and close the first opening; and a second gate pivotably coupled to the carabiner body, the second gate, when closed, defining a first area and a second area, the second gate, when closed, providing a separator between the first area and the second area that prevents an object from moving between the first area and the second area, and the second gate, when opened, providing a second opening to the second area from the first area, wherein the second gate is configured to be closed via an absence of an external force on the second gate and configured to be opened via a presence of the external force on the second gate; wherein the first gate, when opened, provides the first opening to the first area wherein the first gate is configured to be closed via the absence of the external force on the first gate and configured to be opened via the presence of the external force on the first gate; wherein the first gate is configured to open via rotation in a first rotational direction and the second gate is configured to open via rotation in the first rotational direction; the method comprising:
    sliding an object having an aperture onto the carabiner body while using the object to open the first opening via the first gate to enter the first area;
    sliding the object around the carabiner body;
    using the object to open the second gate; and
    sliding the object into the second area;
    wherein the first gate, when closed, contacts a first stop located on the first side, and the second gate, when closed, contacts a second stop located on the second side.

12. The method of claim 11, wherein the first gate opens inwardly on the carabiner body in the first rotational direction.

13. The method of claim 12, wherein the second gate opens inwardly on the carabiner body in the first rotational direction and closes against the second stop in a direction opposite the first rotational direction.

14. The method of claim 13, wherein the carabiner body includes a cutout that allows the second gate to rotate in the first rotational direction.

15. The method of claim 11, wherein the object is a key and carabiner body comprises a thickness to allow the key to slide along the carabiner body via the aperture.

16. The method of claim 11, wherein the first gate is pivotably coupled to the carabiner body approximately at a center of the carabiner body adjacent to the first opening or below the center of the carabiner body.

17. The method of claim 16, wherein the second gate is pivotably coupled to the carabiner body on the first side below where the first gate is coupled to the carabiner body.

18. The method of claim 11, further comprising an arm formed by the carabiner body that extends inwardly between the first area and the second area.

19. The method of claim 18, wherein the second gate is pivotably coupled to an inwardly extending portion of the arm.

20. The method of claim 18, wherein the carabiner body, including the arm, forms a G shape.

\* \* \* \* \*